Sept. 4, 1934.  C. C. JACOBSON  1,972,710

SELF CHARGING CABLE SHEATH EXTRUSION APPARATUS

Filed Nov. 14, 1932   3 Sheets-Sheet 1

INVENTOR
Conrad C. Jacobson,
BY
Fraser, Myers Manley
ATTORNEYS.

Sept. 4, 1934.    C. C. JACOBSON    1,972,710
SELF CHARGING CABLE SHEATH EXTRUSION APPARATUS
Filed Nov. 14, 1932    3 Sheets-Sheet 3

INVENTOR
Conrad C. Jacobson
BY
Fraser, Myers & Manley
ATTORNEYS.

Patented Sept. 4, 1934

1,972,710

UNITED STATES PATENT OFFICE 1,972,710

SELF-CHARGING CABLE SHEATH EXTRUSION APPARATUS

Conrad C. Jacobson, Glen Ridge, N. J., assignor to John Robertson Co., Inc., Brooklyn, N. Y., a corporation of New York Application November 14, 1932, Serial No. 642,549

8 Claims. (Cl. 207—1)

The present invention relates to a cable sheath extrusion apparatus and to the method of producing cable sheath, and aims to provide certain improvements therein.

In cable sheathing as heretofore produced by the extrusion process, inherent defects have been recognized which have been traced to the presence of oxides in the lead, which oxides cause the formation of seams in the lead sheath at points where the divided streams of lead re-unite, and also cause seams between the successive charges of metal. Means and methods for overcoming these defects are disclosed in my co-pending applications, as follows: Serial No. 626,442, filed July 30, 1932, wherein I have shown and described a method and apparatus for extruding oxide-free cable sheath; Serial No. 628,459, filed August 12, 1932, wherein I have shown and described a weldless die block for extrusion presses for producing cable sheathing free from so-called joint defects; and Serial No. 632,556, filed September 10, 1932, wherein I have disclosed an apparatus and method for producing both oxide-free and joint-free cable sheathing.

According to my present invention I provide a cable press embodying the fundamental features disclosed in my aforementioned applications, and in addition thereto one which is capable of automatically delivering molten lead or the like from the melting kettle to the charging chamber and extrusion cylinder in the least possible time. Preferably the charging is accomplished by the pressure of a non-oxidizing gas within the melting kettle, although other means may be satisfactorily employed. The invention also contemplates other features of novelty in the apparatus, which will be apparent from the detailed description which follows, when considered in conjunction with the accompanying drawings which disclose a preferred embodiment of my invention, and wherein—

Figure 1:
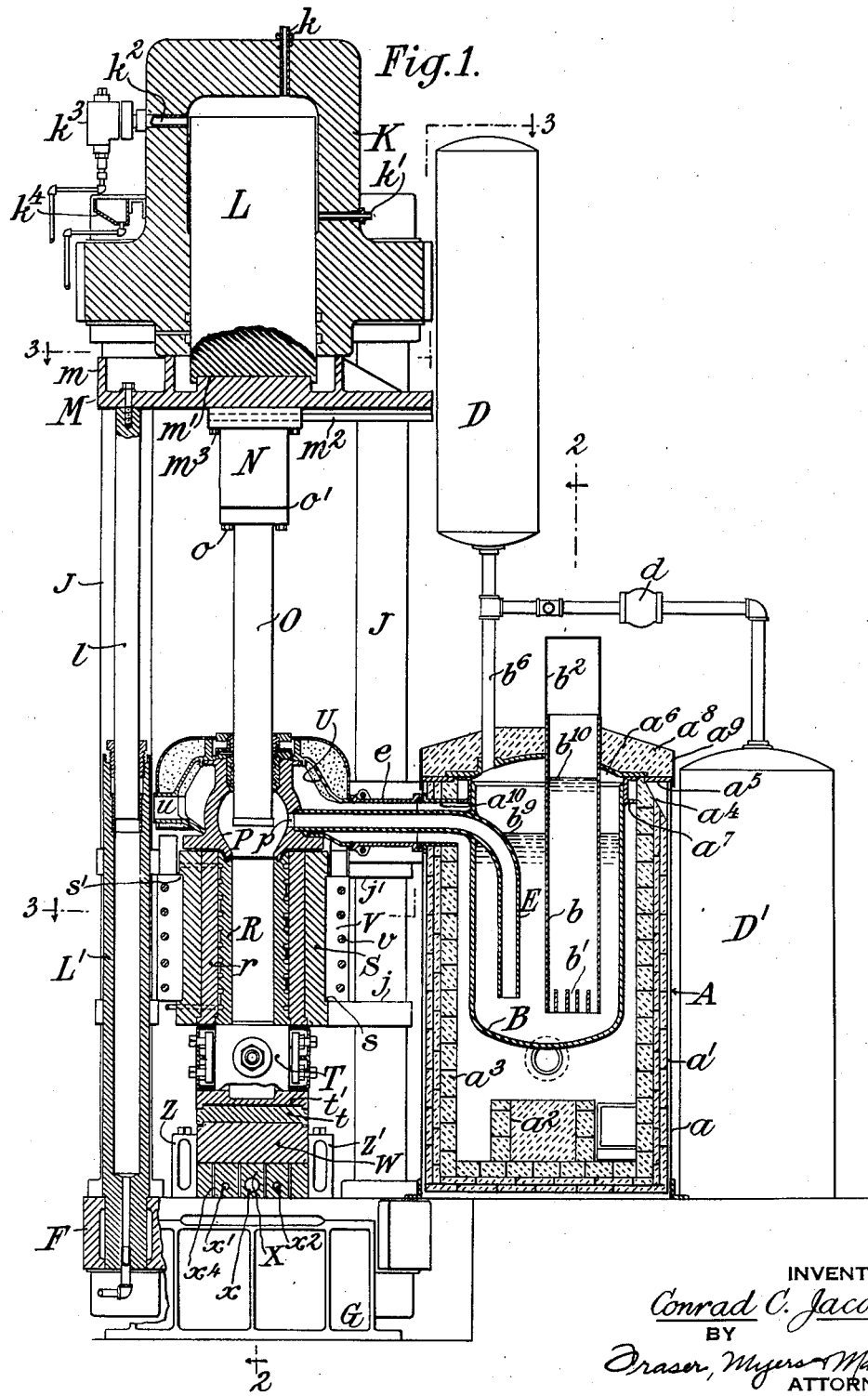
Figure 1 is a vertical section with parts in elevation, of my improved melting kettle and extrusion press.
Figure 2:
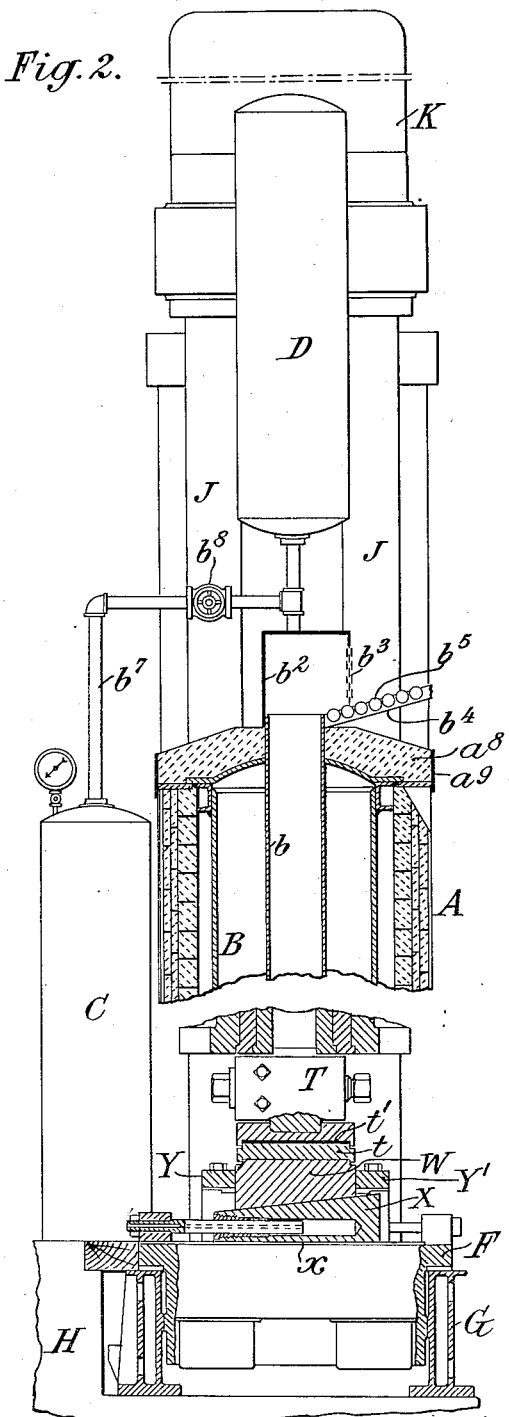
Fig. 2 is a section taken substantially along the planes of the lines 2—2 of Fig. 1.
Figure 3:
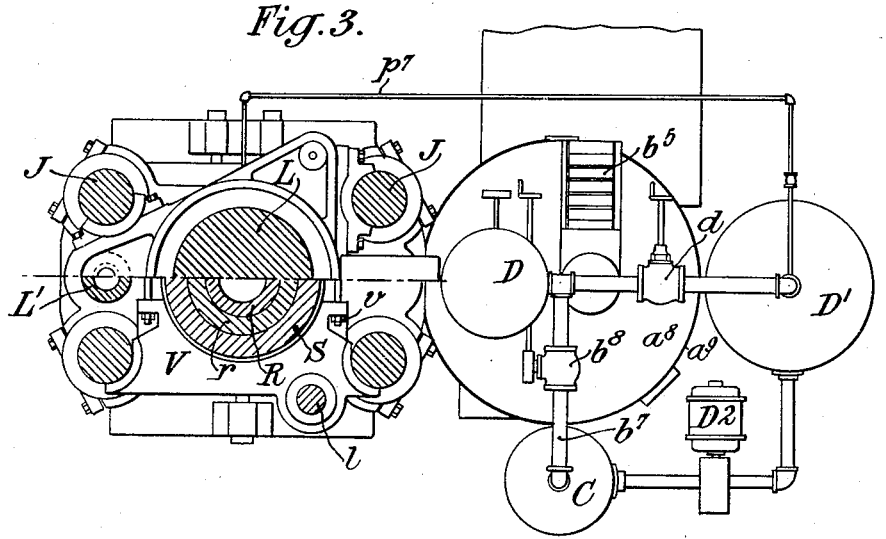
Fig. 3 is a composite top plan and section taken substantially along the planes of the lines 3—3 of Fig. 1.

Referring to the drawings, let A indicate a furnace which comprises a cylindrical, rigid supporting shell $a$, a furnace shell $a'$ which carries a fire box $a^2$ and furnace insulated wall $a^3$, said shell $a'$ at its top being provided with brackets $a^4$ to which is secured a top plate $a^5$ which overhangs the supporting shell $a$ whereby the furnace is dependingly supported upon said shell $a$. Resting upon the top plate $a^5$ is a cover plate $a^6$ which carries a channel ring $a^7$, to which, in turn, is secured the melting kettle B, so that said kettle is dependingly supported by the cover plate $a^6$. Suitable insulation $a^8$ is carried by the cover plate $a^6$, and said insulation is surrounded by a metal ring $a^9$ adapted to fit over the furnace top plate $a^5$ when the furnace cover is mounted in position upon said plate.

Extending into the melting kettle B through the top thereof and preferably eccentrically with respect thereto, is a cylindrical melting chamber $b$, the lower end of which is spaced from the bottom of the kettle and is provided with a grid $b'$, the top of the melting chamber being covered by a charging hood $b^2$ provided with a chain guard $b^3$ which overhangs an inclined charging table $b^4$ provided with rollers $b^5$. For maintaining a non-oxidizing or inert atmosphere above the surface of the molten metal in the kettle B there extends through the top of the furnace into the melting kettle, a pipe or conduit $b^6$ connecting with a tank C of non-oxidizing or inert gas under pressure, such as carbon dioxide, the said gas being supplied to the melting kettle through a pipe $b^7$ and controlled by a valve $b^8$. Preferably the pressure of the inert gas within the melting kettle is maintained at several pounds above atmosphere, for a purpose which will be presently made apparent, and for taking care of expansion of the gas within the kettle due to heating, I provide an expansion tank D which is directly connected to the kettle by the conduit $b^6$.

Extending through the wall of the melting kettle near the top thereof and fitted thereto is a molten metal charging pipe E of relatively large diameter. Said pipe is preferably bent and one end extends downwardly into the kettle to a point spaced from both the bottom and inner wall of the kettle, and the other end thereof connects with the charging chamber of an extrusion press, the construction of which will be presently described. Where the charging pipe E passes through the wall of the furnace the latter is provided with an enlarged opening $a^{10}$, and between said furnace and the charging chamber the said pipe E is surrounded by a flue pipe $e$ which is preferably made in two parts to facilitate its assembly in enclosing relation around the pipe E.

The extrusion press, which is adapted to directly receive the molten metal in its charging chamber, is preferably of the vertical type and consists of a base F mounted upon standards G supported upon a suitable foundation H, said base supporting a plurality of columns J (four in number), which at their upper ends support a hydraulic cylinder K, within which is movable a hydraulic ram L. The hydraulic cylinder K is suitably provided at its top with a vent $k$ for venting air from the cylinder preparatory to filling the cylinder with water through the opening $k^2$ with a vent $k'$ in its side for draining the cylinder when it is desired to re-pack the same, and with a quick return valve $k^3$ connecting with the opening $k^2$ for expediting the emptying of the cylinder on the upward stroke of the ram. Below the quick return valve $k^3$ is a drip or drain pan $k^4$ for taking care of any leakage through said valve. For returning the hydraulic ram at the end of an extrusion stroke, there is provided a plurality of hydraulic backing cylinders L' (three in number) within each of which is movable a backing ram $l$, to the tops of which is connected a pushback platen M having upstanding flanges $m$ and a central projection $m'$ which abuts against the bottom of the hydraulic ram L. On the underside of the platen M is a slide rail $m^2$ upon which is slidably mounted a filler block N which is normally secured centrally to the platen M by bolts $m^3$. Detachably secured to the bottom of the filler block N through the medium of bolts $o$, is the top of an extrusion ram O, an asbestos packing $o'$ being preferably positioned between said elements to prevent the dissipation of heat from the extrusion ram to the filler block. At its lower end the extrusion ram is provided with a guard ring $o^2$ of Monel metal or the like to prevent scoring the extrusion cylinder. The filler block N which is readily disconnectable from both the platen and the extrusion ram by the withdrawal of the bolts $m^3$ and $o$, may be thereupon laterally moved to one side along the slide rail $m^2$ to facilitate the removal of both the hydraulic ram L and the extrusion ram O from their respective cylinders for the purpose of repairs or inspection.

The extrusion ram O is directly movable through a charging chamber P, which charging chamber is mounted directly above an extrusion cylinder R enclosed within a bushing $r$ and an enclosing jacket S, which extrusion cylinder, in turn, is positioned directly above a die-block T so as to be in direct communication with the extrusion chamber thereof.

The charging chamber P is formed with an opening $p$ for connection with the charging pipe E and is fitted at its top with a special self-packing gland $p'$ through which the ram O operates. The packing gland $p'$ is formed with internal annular groves $p^2$, and above said gland $p'$ the charging chamber is fitted with a second gland consisting of the rings $p^3$, $p^4$, $p^5$ and asbestos packing rings $p^6$. Extending through the ring $p^3$ is a pipe $p^7$ for charging a chamber within said ring $p^3$ below the packing $p^6$ with gas for preventing the outside air gaining access to the charging chamber.

Figure 4:
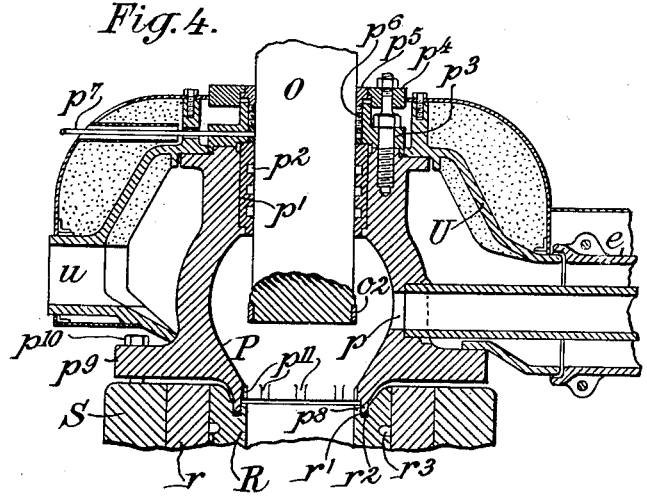
Fig. 4 is an enlarged sectional view of the charging chamber shown in Fig. 1.

The extrudable metal in the charging chamber around the ram must be maintained in its molten state, and suitable means are provided for accomplishing this. As herein shown, an insulated heating oven U surrounds the charging chamber, and said oven may be suitably heated by means of oil or gas through the opening $u$ in one side thereof and the flue pipe $e$ relied upon to carry off the products of combustion through the fume vent of the furnace (not shown). If desired, electric means may be used for heating the oven and for maintaining the metal in the charging pipe E between the melting kettle and the charging chamber in the molten state. The charging chamber P is suitably connected to the extrusion cylinder through the medium of a depending flange $p^8$ engaging in an annular groove $r'$ within the top of the extrusion cylinder, within which groove there preferably is a sealing ring of soft steel or the like $r^2$. To tightly clamp said charging chamber to said extrusion cylinder, the former is provided with a flange $p^9$ through which securing bolts $p^{10}$ pass into the enclosing jacket S, as best shown in Fig. 4. To relieve the chamber P from strains as the ram O moves through the molten metal into the cylinder R, the throat of the charging chamber is formed with circumferentially spaced slots $p^{11}$.

The extrusion cylinder R at its outer periphery is provided with a plurality of communicating annular grooves $r^3$ through which steam or cooling water may circulate in order to cool the lead within the cylinder preparatory to extruding the same. The enclosing jacket S to which the chamber P is directly connected, is held in position between the columns of the press through the medium of the two clamping members V which engage between collars $j$ and $j'$ on the columns J, and between the shoulders $s$ and $s'$ on the jacket S, the clamping members being held together in clamping engagement around the jacket S through the medium of securing members $v$. The lower ends of the jacket S and the bushing $r$ are each provided with an undercut rabbet within which extends an outwardly directed flange on the bottom of the bushing $r$ and on the extrusion cylinder R, respectively, the interengagement of said parts limiting the upward movement of the cylinder R and the bushing $r$ within the enclosing jacket S.

The die-block T may be of any preferred construction but is preferably made in accordance with the die-block disclosed in my aforementioned co-pending application, Serial No. 628,459. To raise and maintain said die-block in assembled relation with respect to the extrusion cylinder R, I employ a filler block $t$, a slide block W and a hydraulically operated wedge block X, said wedge block being mounted and to be guided in its movement by guide blocks Z and Z'. The wedge block X is provided with a centrally disposed hydraulic cylinder $x$ for moving the wedge block X out of position and two hydraulic cylinders $x'$ and $x^2$ laterally flanking the cylinder $x$ for forcing wedge block X into position, thereby respectively lowering or elevating the slide block W. By this means the die-block T may be lowered from its normal position or raised tightly into position at the bottom end of extrusion cylinder R. To facilitate the lubrication of the top and bottom sides of the wedge block, it is provided with oil holes $x^4$. To prevent dissipation of heat from the die-block T there is provided between the base of said die-block and the filler-block $t$ an asbestos insulation sheet $t'$.

It is proposed to convey the molten metal from the melting kettle B to the charging chamber P through the charging tube E by the pressure of the non-oxidizing gas normally maintained above the surface of the molten metal in the kettle, the normal level of which is indicated at $b^9$. In conveying this metal to the charging chamber it is desired that said metal shall reach up within the self-sealing gland p', and in order that this may be accomplished and ascertained in advance, it is proposed to employ sufficient pressure to raise the lead level in the melting chamber b to the point indicated at $b^{10}$ which will correspond to the lead level inside the gland p'. The lead level in the melting chamber can be ascertained by inspection through the hood $b^2$. Of course this level can be controlled by varying the gas pressure within the melting kettle. It will be appreciated, however, that other means for causing a flowing of the molten metal from the kettle to the charging chamber may be resorted to, for example, by maintaining the normal height of the molten metal in the kettle above the top of the charging tube.

*Operation.*—Let us assume that the first, or cleaning out charge for the press has been extruded and that extrusion ram O is at the bottom of the extrusion cylinder R, the die-block and all bottom outlets to the cylinder being tightly sealed with the lead which has been under pressure. During this time the charging chamber P remains filled with molten lead under pressure, and as soon as the extrusion ram returns to its top position the molten lead in the charging chamber followed up by the molten lead under pressure at the melting pot immediately fills the extrusion cylinder. The gas pressure on the molten lead in the melting pot causes the automatic inrush of molten lead into the charging chamber and thence into the extrusion cylinder as soon as the ram leaves the extrusion cylinder. The gas seal provided at the gland parts $p^3$ to $p^7$ will keep the outside air from gaining access to the lead in the charging chamber as the ram moves outwardly. The extrusion ram O is then advanced or caused to descend until it enters the extrusion cylinder and is there held for the normal period for cooling the lead cylinder charge, the cooling being effected by the fluid circulating through the passages $r^3$ around the cylinder R.

The cooperative action of the gas sealed melting pot, the gas sealed charging chamber and the self-charging press wherein the movement of the extruding ram in effect constitutes a valve automatically controlling the admission of lead into the extruding cylinder, eliminate the possibility of oxides getting into the extruded lead sheath, eliminate the formation of oxide coatings between the charges in the lead cylinder, and eliminate the coating of oxides between the weld formed at the bottom of the lead sheath in the weldless die-block T. The charging pipe E, which is of relatively large diameter, enables the filling of the extrusion cylinder in less than two seconds, which action will also tend to improve very materially the fusing together of one charge after the other in the lead cylinder. It will thus be seen that my present apparatus is adapted to admirably function to provide cable sheathing free from the inherent defects customarily found therein and to accomplish this in a practically automatic and expeditious manner.

In order to make the gas-supplying unit complete and self-sustaining, the gas from tank D and melting kettle B may be substantially completely discharged into tank D' upon closing the valve $b^8$ and opening the valve d, and the gas from tank D' may be delivered back to pressure tank C by means of the compressor unit $D^2$.

While I have shown and described a preferred embodiment of my invention and the manner in which the same may be carried into practice, I do not wish to be limited to the specific arrangement of parts and details of construction, since it will be apparent that the same may be varied within the range of engineering skill without departing from the spirit of the invention.

What I claim is:

1. An extrusion press comprising a chamber adapted to receive molten metal, a ram extending into said chamber, a gland in said chamber through which gland said ram is slidable, said gland having self-sealing means for preventing the escape of molten metal from the chamber around the ram when said metal is subjected to pressure therein, and means above the self-sealing means in the gland for providing a gas seal around said ram.

2. An extrusion press comprising a chamber adapted to receive molten metal, a ram extending into said chamber, a gland in said chamber through which gland said ram is slidable, said gland having a plurality of spaced grooves adapted to receive escaping metal from the chamber around the ram when said metal is subjected to pressure therein, and means above said gland around said ram for receiving gas under pressure for providing a secondary seal and preventing the ingress of air into the chamber around the ram.

3. In combination with an extrusion press comprising an extrusion cylinder, a charging chamber of larger diameter than the extrusion cylinder directly above the cylinder and an extrusion ram movable through said charging chamber and slidingly fitting into the extrusion cylinder, a source of molten metal and means providing a direct connection between the source of molten metal and the charging chamber, a gland in the ram entrance to said charging chamber having self-sealing means for preventing the escape of molten metal from the chamber around the ram, and said molten metal at its source having a sufficient pressure head to force said molten metal up into the self-sealing gland in the charging chamber.

4. An extrusion press comprising a pressure cylinder, a piston movable in said pressure cylinder, a plurality of backing cylinders, a platen carried by said backing cylinders and abutting said piston, an extrusion cylinder in axial spaced relation to the pressure cylinder, a ram movable in said extrusion cylinder and a filler block between said ram and said platen and connected to said elements, and cooperating means on said filler block and said platen providing a transverse slide connection therebetween said filler block being laterally displaceable on said platen along said slide connection.

5. A vertical extrusion press, comprising a vertical extrusion cylinder, a die-block below said cylinder for operative engagement therewith and means for raising and maintaining the die-block in such position, said means comprising a wedge-block and a slide-block cooperating with the wedge-block.

6. A vertical extrusion press, comprising a vertical extrusion cylinder, a die-block below said cylinder for operative engagement therewith and means for raising and maintaining the die-block in such position, said means comprising a hydraulically ram-controlled wedge-block and a slide-block cooperating with the wedge-block, and means for guiding the wedge-block and slide-block in their movements.

7. The method of charging molten metal into an extrusion cylinder within which a ram is reciprocable, which comprises intermittently simultaneously charging the molten metal to a chamber closed to atmosphere above the cylinder past a point above the level of the molten metal at its source by pressure of gas acting upon said molten metal source and from said chamber to said cylinder, by alternately establishing communication between said chamber and cylinder as the end of the ram is withdrawn from the cylinder into the chamber and by cutting off such communication as the end of the ram enters said cylinder.

8. In combination, a vertical extrusion press comprising an extrusion cylinder, a chamber closed to atmosphere directly above the extrusion cylinder in open communication therewith, an extrusion ram movable through the chamber and slidingly fitting into the extrusion cylinder and a gland in the ram entrance to the chamber having self-sealing means for preventing the escape of molten metal around the ram, a melting kettle laterally disposed to the press and having a closure at its top and a reservoir of non-oxidizing gas in communication with the interior of the kettle above the surface of the molten metal therein, a conduit having a portion thereof extending above the level of the molten metal in the kettle and one end dipping into said molten metal providing a direct connection between said molten metal and the chamber, the pressure of the gas acting upon the surface of the molten metal in the kettle being sufficient to force the molten metal through said conduit into the chamber and up into the gland thereof, and a vertical charging chamber in the kettle, one end of said chamber dipping below the surface of the molten metal in the kettle and the other end extending through the top of the kettle, said charging chamber also serving as a gauge for indicating the height to which the molten metal will rise in the charging chamber due to the pressure of the gas on the molten metal in the kettle.

CONRAD C. JACOBSON.